US006847386B2

(12) United States Patent
Paleiov

(10) Patent No.: US 6,847,386 B2
(45) Date of Patent: Jan. 25, 2005

(54) VISUAL CUE FOR ON-SCREEN SCROLLING

(75) Inventor: Ilan Paleiov, Kfar Vradim (IL)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 09/883,182

(22) Filed: Jun. 19, 2001

(65) Prior Publication Data

US 2002/0191005 A1 Dec. 19, 2002

(51) Int. Cl.$^7$ ................................. G09G 5/00
(52) U.S. Cl. .................. 345/684; 345/688; 345/786
(58) Field of Search ............................. 345/684, 685, 345/688, 786, 787

(56) References Cited

U.S. PATENT DOCUMENTS

| | | | | |
|---|---|---|---|---|
| 5,121,114 A | * | 6/1992 | Nagasawa et al. ......... | 345/684 |
| 5,339,391 A | * | 8/1994 | Wroblewski et al. ....... | 345/787 |
| 5,506,951 A | * | 4/1996 | Ishikawa ..................... | 345/787 |
| 5,850,211 A | * | 12/1998 | Tognazzini ................. | 345/158 |
| 5,884,256 A | * | 3/1999 | Bennett et al. ............. | 704/235 |
| 5,930,809 A | * | 7/1999 | Middlebrook ............... | 707/501 |
| 6,020,887 A | * | 2/2000 | Loring et al. ............... | 345/786 |
| 6,351,273 B1 | * | 2/2002 | Lemelson et al. .......... | 345/786 |
| 6,476,831 B1 | * | 11/2002 | Wirth et al. ................. | 345/784 |

* cited by examiner

*Primary Examiner*—Matthew Luu
(74) *Attorney, Agent, or Firm*—McGuireWoods LLP; Daniel Kligler

(57) ABSTRACT

A method for displaying data on a computer screen. The method includes receiving a user command to scroll the data displayed on the screen, scrolling the data displayed on the screen so that a line of data in proximity to a first edge of the screen is shifted to appear in proximity to a second edge opposite the first edge after scrolling, and visually marking the shifted line of data. Apparatus, and a computer software product, for performing the above method is also provided.

39 Claims, 2 Drawing Sheets

VISUAL CUE FOR ON-SCREEN SCROLLING

FIELD OF THE INVENTION

The present invention relates to the field of features provided in personal computing applications, particularly features that improve user convenience when scrolling through data displayed on a screen.

BACKGROUND OF THE INVENTION

Many personal computing applications, such as word processors, spreadsheets and Web browsers, are designed to process and display large data files, such as textual documents, while allowing only a portion of the data to be displayed on the screen at any one time. The computing applications allow a user to change the currently displayed data, by moving backwards, forwards, right or left through the data, whether the text of a document, or the data contained in a spreadsheet. A variety of methods are available for moving through a file, including moving an on-screen cursor using arrow buttons; clicking with a mouse on a scroll bar; and by pressing buttons on a keyboard, such as Page Up and Page Down keys.

Typically, after reading the last line of text displayed on a screen in a word processing document, a reader presses the Page Down button, or clicks on the scrollbar below the box, to display the following portion of text. These actions typically cause the text displayed on the screen to be updated, with the last line of on-screen text shifted to become either the first or second line of text on the screen. Updating the screen typically occurs virtually instantaneously, which causes a reader to lose visual connection with the (formerly) last line of text after it has been shifted. A reader thus has to locate the new, shifted position of the line of text and refocus on it, each time he uses a Page Down function. When reading long documents, the time lost finding and refocusing on lines of data becomes significant, and detracts from the convenience and ease-of-use of the computing application.

There is thus a need in the art for apparatus and a method for improving the ease-of-use of scrolling functions on a personal computing application.

SUMMARY OF THE INVENTION

The present invention seeks to provide a method and apparatus for providing a visual cue to allow a user to focus on a line of data shifted from one edge of a screen to its opposite edge, when scrolling through on-screen data. When the on-screen data is a textual document, the present invention reduces the time a user takes to read the document.

In accordance with a preferred embodiment of the present invention, a user inputs a command to a computing device, and responsive thereto, the on-screen data is scrolled in the requested direction. The user input may comprise, for example, a verbal input translated by voice recognition software; pressing a button on a keyboard, such as the Page Down button; or clicking a mouse on a specified area of the screen, such as on the scrollbar.

In accordance with a first preferred embodiment of the present invention, when scrolling down through data displayed on a screen, a line of data in the vicinity of the lower edge of the screen is shifted to appear in the vicinity of the top edge after scrolling, and is visually marked so as to draw a user's attention thereto.

In accordance with a second preferred embodiment of the present invention, when scrolling up through data displayed on a screen, a line of data in the vicinity of the top edge of the screen is shifted to appear in the vicinity of the bottom edge after scrolling, and is visually marked so as to draw a user's attention thereto.

In accordance with a third preferred embodiment of the present invention, when scrolling right through data displayed on a screen, a line of data in the vicinity of the right edge of the screen is shifted to appear in the vicinity of the left edge after scrolling, and is visually marked so as to draw a user's attention thereto.

In accordance with a fourth preferred embodiment of the present invention, when scrolling left through data displayed on a screen, a line of data in the vicinity of the left edge of the screen is shifted to appear in the vicinity of the right edge after scrolling, and is visually marked so as to draw a user's attention thereto.

In a preferred embodiment of the present invention, the line of data in the vicinity of a first edge of the screen which is shifted to the vicinity of the opposite edge, and marked, comprises the complete line of data closest to the first edge of the screen. Alternatively, the line of data in the vicinity of a first edge of the screen which is shifted to the opposite edge, and marked, comprises the complete line of data second closest to the first edge of the screen or otherwise in close proximity to the first edge.

In a preferred embodiment, the line of data, once shifted to the vicinity of the opposite edge of the screen, and marked, is located closest to the opposite edge of the screen. In an alternative preferred embodiment, the location of the line of data, once shifted, is the second closest line of data to the opposite edge or another line in close proximity to the opposite edge.

In accordance with a preferred embodiment of the present invention, the shifted line of data is marked by altering the on-screen appearance of the line of data or of a portion of the line of data.

The appearance of the line of text or other data is altered, for example, by causing the line of text to flash, blink, change font, change color, or become bold. Alternatively, a combination of these alterations may be used to mark the line in question. Other techniques of marking will be apparent to those skilled in the art.

In accordance with a preferred embodiment of the present invention, the appearance of the line of data, or portion thereof, is altered transiently. Preferably, the appearance is altered for a time period sufficient for a user's attention to be drawn to the position of the shifted line of data. At the conclusion of this time period, the marked line of data reverts to its original appearance.

There is thus provided, in accordance with a preferred embodiment of the present invention, a method for displaying data on a computer screen, the method including receiving a user command to scroll the data displayed on the screen, scrolling the data displayed on the screen so that a line of data in proximity to a first edge of the screen is shifted to appear in proximity to a second edge, opposite the first edge after scrolling, and visually marking the shifted line of data.

Further in accordance with a preferred embodiment of the present invention, the method includes the step of reverting the shifted line of data to an original appearance thereof after a predetermined time period has elapsed.

There is further provided, in accordance with another preferred embodiment of the present invention, apparatus for displaying data on a computer screen, including a computing device, a display screen coupled to be driven by the computing device to display a plurality of lines of data, and a user input mechanism configured to receive a user command to scroll the data displayed on the screen, wherein the computing device, responsive to the user command, is adapted to scroll the data displayed on the screen so that a line of data in proximity to a first edge of the screen is shifted to appear in proximity to a second, opposite edge of the screen after scrolling, and to visually mark the shifted line of data.

Still further in accordance with a preferred embodiment of the present invention, the computing device is also adapted to revert the shifted line of data to an original appearance thereof after a predetermined time period has elapsed.

There is also provided, in accordance with another preferred embodiment of the present invention, a computer software product, including a computer-readable medium in which program instructions are stored, which instructions, when read by a computer, cause the computer to receive a user command to scroll data displayed on a display screen coupled to the computer, and responsive thereto, to scroll the data displayed on the screen so that a line of data in proximity to a first edge of the screen is shifted to appear in proximity to a second edge, opposite the first edge, after scrolling, and to visually mark the shifted line of data.

Additionally in accordance with a preferred embodiment of the present invention, the instructions cause the computer to revert the shifted line of data to an original appearance thereof after a predetermined time period has elapsed.

Also in accordance with a preferred embodiment of the present invention, the shifted line of data is visually marked by a means selected from the group consisting of bolding, underlining, flashing, blinking, graying out, hiding, changing font, changing font size, and changing a color of the line of data.

Further in accordance with a preferred embodiment of the present invention, the shifted line of data is visually marked transiently.

Still further in accordance with a preferred embodiment of the present invention, the first and second edges are upper and lower edges, and the data is scrolled vertically.

Additionally in accordance with a preferred embodiment of the present invention, a line of data in proximity to the lower edge of the screen is shifted to appear in proximity to the upper edge after scrolling.

Also in accordance with a preferred embodiment of the present invention, a line of data in proximity to the upper edge of the screen is shifted to appear in proximity to the lower edge after scrolling.

Further in accordance with a preferred embodiment of the present invention, the first and second edges are right and left edges, and the data is scrolled horizontally.

Still further in accordance with a preferred embodiment of the present invention, the line of data in proximity to one of the edges of the screen is a line of data adjacent to the edge of the screen.

Additionally in accordance with a preferred embodiment of the present invention, the line of data in proximity to one of the edges of the screen is a line of data penultimately adjacent to the edge of the screen.

Also in accordance with a preferred embodiment of the present invention, the user command comprises clicking on a scrollbar on the display screen.

Further in accordance with a preferred embodiment of the present invention, the user command comprises a verbal command.

Still further in accordance with a preferred embodiment of the present invention, the user command comprises pressing a button on a computer keyboard.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
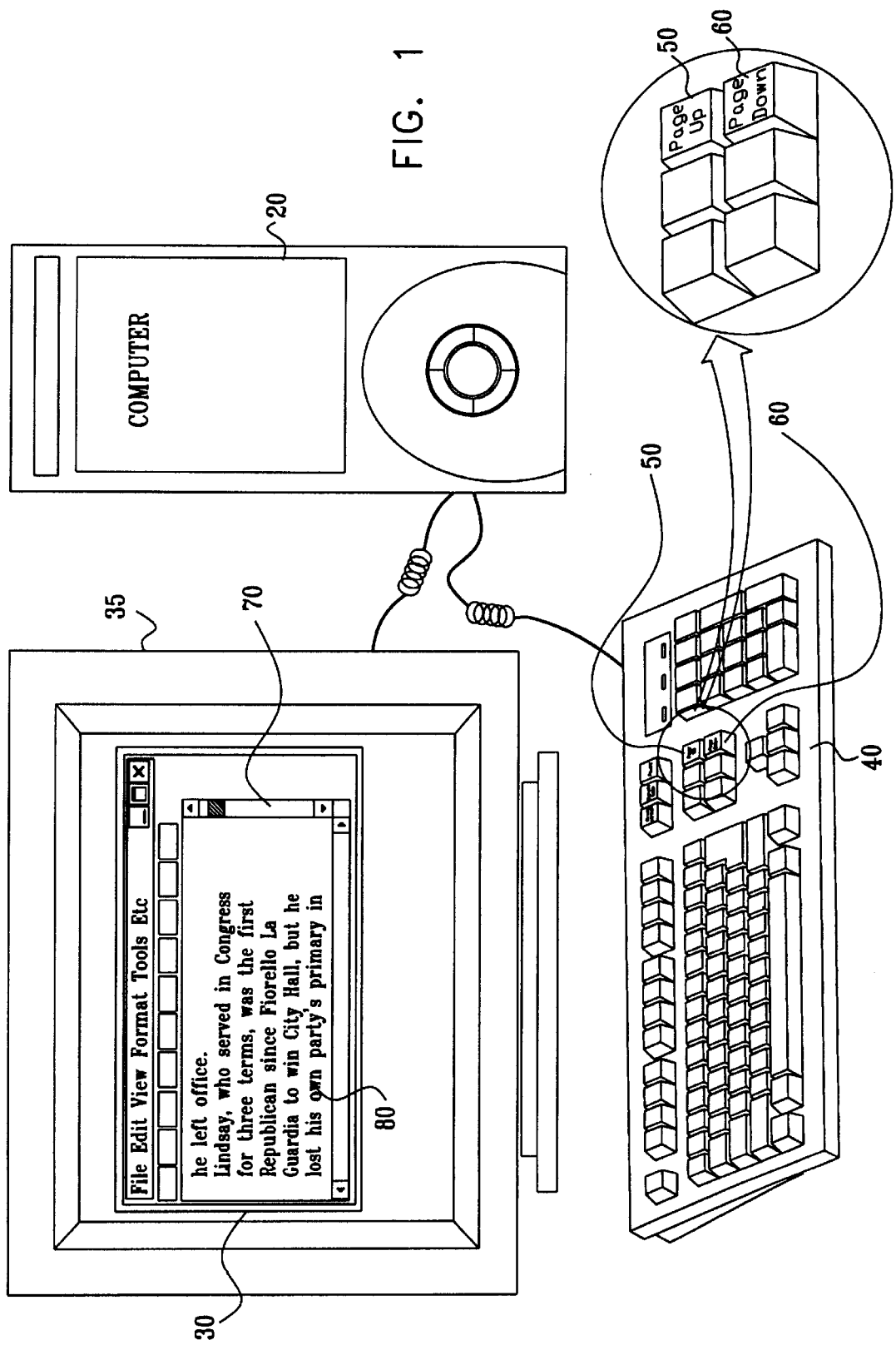
FIG. 1 is a schematic illustration of a computer running a word-processing application, prior to scrolling of the screen.

Reference is now made to FIG. 1, which is a schematic illustration of a computer 20 running a word-processing application. Computer 20 is connected to a keyboard 40 having a Page Up button 50 and a Page Down button 60. A word processing document 30 is displayed on a computer display screen 35. Document 30, which is manipulated via the word processing application, contains several lines of text, a last displayed line of text 80 being "lost his own party's primary in".

Figure 2:
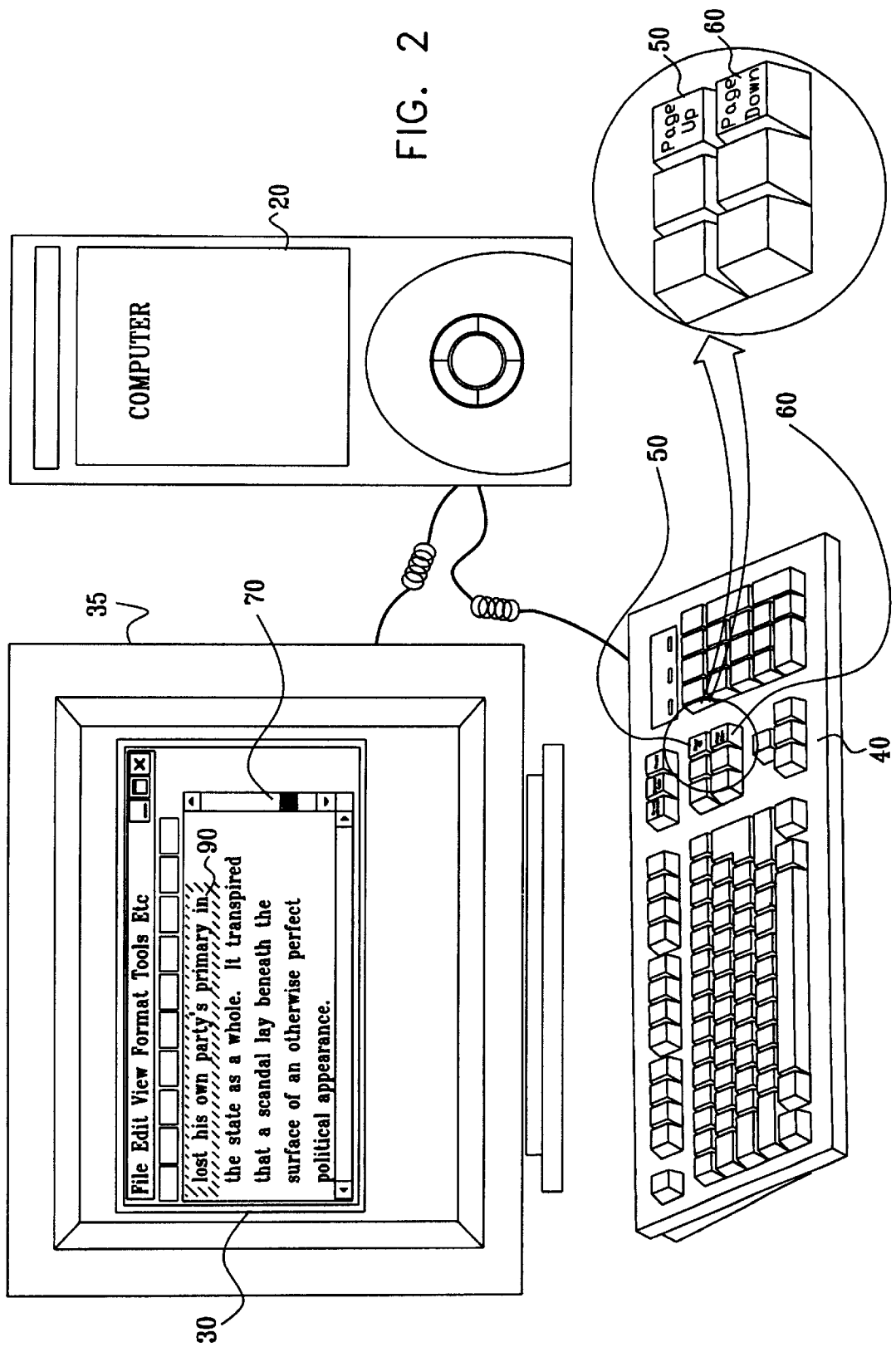
FIG. 2 is a schematic illustration of the computer of FIG. 1 after scrolling of the screen, in accordance with a preferred embodiment of the present invention.

Reference is now made to FIG. 2 which is a schematic illustration of the computer of FIG. 1, running the word-processing application, after Page Down button 60 has been pressed, in accordance with a preferred embodiment of the present invention. Pressing Page Down button 60 causes the displayed text of document 30 to be shifted so that last line of text 80 becomes a first line of text 90 displayed on the screen. The same effect can be achieved, for example, by clicking on a scroll bar 70 with a mouse (not shown).

In accordance with a preferred embodiment of the present invention, line of text 90 is accorded a visual feature, i.e. its appearance is changed, so as to rapidly draw a user's attention thereto. The visual feature may include, but is not limited to, causing line of text 90 to flash, blink, change font, change color, or become bold. Additionally, the visual feature may include graying out, hiding, changing the font size, and underlining line of text 90.

In accordance with a preferred embodiment of the present invention, the duration of the visual feature extends for as long as it takes to attract and focus a user's attention. Typically the duration is between a fraction of a second and several seconds. Preferably, the duration is user definable. Thereafter, line of text 90 preferably returns to its original appearance.

In an alternative preferred embodiment, the initial position of the line of text that, once shifted, is marked with the visual feature, is the second closest line to the lower edge of the screen.

In a further alternative preferred embodiment, the shifted position of the marked line of text is the second closest line to the upper edge of the screen.

The present embodiment has been described above with respect to scrolling down an on-screen textual document, i.e., shifting displayed text upwards on the screen. It will be readily appreciated that the present invention is equally applicable to scrolling up, right and left through on-screen data, so that a line of data in the vicinity of one edge of the screen is shifted to appear in the vicinity of a second opposite edge after scrolling, and is visually marked to draw a user's attention thereto.

It will be appreciated that the present invention may be implemented in a wide range of different computing applications, including not only word processing applications, but also Web browsers, spreadsheets and the like. Computer software for carrying out the functions of the present invention may be supplied as a part of these applications or of the computer operating system, or it may alternatively be supplied as a separate software product, for operation in conjunction with such applications. The software for these purposes may be downloaded to computer 20 in electronic form, over a network, for example, or it may alternatively be supplied on tangible media, such as CD-ROM, for installation in the computer.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

What is claimed is:

1. A method for displaying data on a computer screen, the method comprising:
   receiving a user command to scroll the data displayed on the screen;
   scrolling the data displayed on the screen so that a line of data in proximity to a first edge of the screen is shifted to appear in proximity to a second edge, opposite the first edge after scrolling; and
   visually marking the shifted line of data in proximity to the second edge responsively to scrolling the data.

2. A method according to claim 1 wherein the first and second edges are upper and lower edges, and the data is scrolled vertically.

3. A method according to claim 2 wherein a line of data in proximity to the lower edge of the screen is shifted to appear in proximity to the upper edge after scrolling.

4. A method according to claim 2 wherein a line of data in proximity to the upper edge of the screen is shifted to appear in proximity to the lower edge after scrolling.

5. A method according to claim 1 wherein the line of data in proximity to one of the edges of the screen is a line of data adjacent to the edge of the screen.

6. A method according to claim 1 wherein the line of data in proximity to one of the edges of the screen is a line of data penultimately adjacent to the edge of the screen.

7. A method according to claim 1 wherein the user command comprises clicking on a scrollbar on the computer screen.

8. A method according to claim 1 wherein the user command comprises a verbal command.

9. A method according to claim 1 wherein the user command comprises pressing a button on a computer keyboard.

10. A method according to claim 1 wherein the first and second edges are right and left edges, and the data is scrolled horizontally.

11. A method according to claim 1 wherein visually marking the shifted line of data is selected from the group consisting of bolding, underlining, flashing, blinking, graying out, hiding, changing font, changing font size, and changing a color of the line of data.

12. A method according to claim 1 wherein visually marking the shifted line of data comprises marking the shifted line transiently.

13. A method according to claim 12, and also comprising the step of reverting the shifted line of data to an original appearance thereof after a predetermined time period has elapsed.

14. Apparatus for displaying data on a computer screen, comprising:
    a computing device;
    a display screen, coupled to be driven by the computing device to display a plurality of lines of data; and
    a user input mechanism configured to receive a user command to scroll the data displayed on the screen,
    wherein the computing device, responsive to the user command, is adapted to scroll the data displayed on the screen so that a line of data in proximity to a first edge of the screen is shifted to appear in proximity to a second, opposite edge of the screen after scrolling, and to visually mark the shifted line of data in proximity to the second edge responsively to scrolling the data.

15. Apparatus according to claim 14 wherein the first and second edges are upper and lower edges, and the data is scrolled vertically.

16. Apparatus according to claim 15 wherein a line of data in proximity to the lower edge of the screen is shifted to appear in proximity to the upper edge after scrolling.

17. Apparatus according to claim 15 wherein a line of data in proximity to the upper edge of the screen is shifted to appear in proximity to the lower edge after scrolling.

18. Apparatus according to claim 14 wherein the line of data in proximity to one of the edges of the screen is a line of data adjacent to the edge of the screen.

19. Apparatus according to claim 14 wherein the line of data in proximity to one of the edges of the screen is a line of data penultimately adjacent to the edge of the screen.

20. Apparatus according to claim 14 wherein the user command comprises clicking on a scrollbar on the computer screen.

21. Apparatus according to claim 14 wherein the user command comprises a verbal command.

22. Apparatus according to claim 14 wherein the user command comprises pressing a button on a computer keyboard.

23. Apparatus according to claim 14 wherein the first and second edges are right and left edges, and the data is scrolled horizontally.

24. Apparatus according to claim 14 wherein the shifted line of data is visually marked by a means selected from the group consisting of bolding, underlining, flashing, blinking, graying out, hiding, changing font, changing font size, and changing a color of the line of data.

25. Apparatus according to claim 14 wherein the shifted line of data is visually marked transiently.

26. Apparatus according to claim 25, wherein the computing device is also adapted to revert the shifted line of data to an original appearance thereof after a predetermined time period has elapsed.

27. A computer software product, comprising a computer-readable medium in which program instructions are stored, which instructions, when read by a computer, cause the computer to receive a user command to scroll data displayed on a display screen coupled to the computer, and responsive thereto, to scroll the data displayed on the screen so that a line of data in proximity to a first edge of the screen is shifted to appear in proximity to a second edge, opposite the first edge, after scrolling and to visually mark the shifted line of data in proximity to the second edge responsively to scrolling the data.

28. A computer software product according to claim 27 wherein the shifted line of data is visually marked by a means selected from the group consisting of bolding, underlining, flashing, blinking, graying out, hiding, changing font, changing font size, and changing a color of the line of data.

29. A computer software product according to claim 27 wherein the shifted line of data is visually marked transiently.

30. A computer software product according to claim 29, wherein the instructions cause the computer to revert the shifted line of data to an original appearance thereof after a predetermined time period has elapsed.

31. A computer software product according to claim 28 wherein the first and second edges are upper and lower edges, and the data is scrolled vertically.

32. A computer software product according to claim 31 wherein a line of data in proximity to the lower edge of the screen is shifted to appear in proximity to the upper edge after scrolling.

33. A computer software product according to claim 31 wherein a line of data in proximity to the upper edge of the screen is shifted to appear in proximity to the lower edge after scrolling.

34. A computer software product according to claim 28 wherein the first and second edges are right and left edges, and the data is scrolled horizontally.

35. A computer software product according to claim 28 wherein the line of data in proximity to one of the edges of the screen is a line of data adjacent to the edge of the screen.

36. A computer software product according to claim 28 wherein the line of data in proximity to one of the edges of the screen is a line of data penultimately adjacent to the edge of the screen.

37. A computer software product according to claim 28 wherein the user command comprises clicking on a scrollbar on the display screen.

38. A computer software product according to claim 28 wherein the user command comprises a verbal command.

39. A computer software product according to claim 28 wherein the user command comprises pressing a button on a computer keyboard.

* * * * *